US00RE48142E

(19) United States
(12) Reissued Patent
Plate

(10) Patent Number: US RE48,142 E
(45) Date of Reissued Patent: Aug. 4, 2020

(54) MAGAZINE LOADER

(71) Applicant: PLATE, LLC, Fort Myers, FL (US)

(72) Inventor: Christopher Andrew Plate, Cape Coral, FL (US)

(73) Assignee: Plate LLC, Cape Coral, FL (US)

(21) Appl. No.: 16/653,649

(22) Filed: Oct. 15, 2019

Related U.S. Patent Documents

Reissue of:
(64) Patent No.: 9,797,669
Issued: Oct. 24, 2017
Appl. No.: 15/598,707
Filed: May 18, 2017

U.S. Applications:
(63) Continuation of application No. 15/294,770, filed on Oct. 16, 2016, now Pat. No. 9,689,633, which is a continuation-in-part of application No. 14/979,051, filed on Dec. 22, 2015, now Pat. No. 9,618,286, which is a continuation-in-part of application No. 14/869,502, filed on Sep. 29, 2015, now abandoned.

(60) Provisional application No. 62/473,994, filed on Mar. 20, 2017, provisional application No. 62/478,090, filed on Mar. 29, 2017.

(51) Int. Cl.
*F41A 9/82* (2006.01)
*F41A 9/83* (2006.01)

(52) U.S. Cl.
CPC ..... *F41A 9/83* (2013.01)

(58) Field of Classification Search
CPC ..... F41A 9/83
See application file for complete search history.

(56) References Cited

U.S. PATENT DOCUMENTS 447,577 A 3/1891 Milanovitch-Koka
581,296 A 4/1897 Von Mannlicher
(Continued)

FOREIGN PATENT DOCUMENTS

DE 3016836 A1 2/1980
DE 3634119 A1 * 4/1988 ..... F41A 9/83
(Continued)

OTHER PUBLICATIONS

Unknown Author, AR-15/ M4 Magazine Loader, Mar. 13, 2014 or earlier, MrLarry0001, https://www.youtube.com/watch?v=AnUk1aNp1PE.

(Continued)

*Primary Examiner* — Jeffrey R Jastrzab
(74) *Attorney, Agent, or Firm* — George F. Wallace

(57) ABSTRACT

A magazine loader include a main body, a rounds recess, and a magazine recess. A plurality of rounds are provided to the rounds recess and positionally maintained by a rounds recess bottom, first and second rounds recess ledges, and first and second rounds recess sides. With a magazine positioned within the magazine recess and the rounds within the rounds recess, as the rounds are slidably moved towards the magazine recess, pivot points of each round successively abuts a downwardly angled portion of the second rounds recess side and pivots to angle a second round end of each round towards the magazine and over another downwardly angled portion of the first rounds recess side, so that each round successively enters the magazine.

24 Claims, 10 Drawing Sheets

(56) References Cited

U.S. PATENT DOCUMENTS

| | | | | |
|---|---|---|---|---|
| 2,403,012 | A * | 7/1946 | McPheters | F41A 9/83 42/87 |
| 4,352,254 | A * | 10/1982 | Peter | F41A 9/83 42/88 |
| 4,392,321 | A | 7/1983 | Bosworth | |
| 4,509,284 | A | 4/1985 | Naber | |
| 4,538,371 | A | 9/1985 | Howard | |
| 4,570,371 | A | 2/1986 | Mears | |
| 4,574,511 | A | 3/1986 | Csongor | |
| 4,632,011 | A | 12/1986 | Metz et al. | |
| 4,690,031 | A | 9/1987 | Metz et al. | |
| 4,706,402 | A * | 11/1987 | Csongor | F41A 9/83 42/87 |
| 4,736,667 | A | 4/1988 | Kochevar et al. | |
| 4,739,572 | A | 4/1988 | Brandenburg | |
| 4,756,110 | A | 7/1988 | Beltron | |
| 4,879,829 | A | 11/1989 | Miller et al. | |
| 4,905,394 | A | 3/1990 | Predazzer | |
| 4,939,862 | A | 7/1990 | Brandenburg et al. | |
| 4,967,723 | A | 11/1990 | Cutrell | |
| 5,319,872 | A | 6/1994 | Bammate | |
| 5,402,594 | A | 4/1995 | Switzer | |
| 6,754,987 | B1 | 6/2004 | Cheng et al. | |
| 6,810,616 | B2 | 11/2004 | Tal et al. | |
| 6,817,133 | B1 | 11/2004 | Williams | |
| 7,059,077 | B2 | 6/2006 | Tal et al. | |
| 7,257,919 | B1 | 8/2007 | Farley | |
| 7,383,657 | B2 | 6/2008 | Pikielny | |
| 7,487,613 | B2 | 2/2009 | Taylor | |
| 7,503,138 | B2 | 3/2009 | Tal et al. | |
| 7,637,048 | B2 | 12/2009 | Tal et al. | |
| 7,805,874 | B2 | 10/2010 | Tal et al. | |
| 7,866,080 | B2 | 1/2011 | Tucker | |
| 8,356,441 | B2 | 1/2013 | Meinel | |
| 8,453,366 | B2 | 6/2013 | Gray | |
| 8,469,014 | B2 | 6/2013 | Hu | |
| 8,650,792 | B1 | 2/2014 | Overmars | |
| 8,915,007 | B1 | 12/2014 | Williams | |
| 8,931,199 | B1 | 1/2015 | Cauley, Jr. et al. | |
| D728,065 | S | 4/2015 | Tal et al. | |
| 9,003,687 | B2 | 4/2015 | Cauley, Jr. et al. | |
| 9,057,570 | B1 | 6/2015 | Tal et al. | |
| 9,212,859 | B1 | 12/2015 | Tal et al. | |
| 10,254,061 | B1 | 4/2019 | Loveday, IV et al. | |
| 10,317,154 | B1 | 6/2019 | Loveday, IV et al. | |
| 10,612,873 | B1 * | 4/2020 | Witecha | F41A 9/83 |
| 2003/0046854 | A1 | 3/2003 | Urchek | |
| 2004/0020096 | A1 | 2/2004 | Tal et al. | |
| 2004/0159035 | A1 * | 8/2004 | Newman | F41A 9/83 42/87 |
| 2005/0081421 | A1 | 4/2005 | Guy et al. | |
| 2007/0017140 | A1 | 1/2007 | Pikeilny | |
| 2007/0107291 | A1 | 5/2007 | Tal et al. | |
| 2008/0184608 | A1 | 8/2008 | Tal et al. | |
| 2008/0184698 | A1 | 8/2008 | Tal et al. | |
| 2008/0244952 | A1 | 10/2008 | Taylor | |
| 2009/0044440 | A1 | 2/2009 | Tal et al. | |
| 2010/0175294 | A1 | 7/2010 | Meinel | |
| 2010/0313460 | A1 | 12/2010 | Tucker | |
| 2012/0060810 | A1 | 3/2012 | Hu | |
| 2013/0067788 | A1 | 3/2013 | Gray | |
| 2013/0192117 | A1 | 8/2013 | Meinel | |
| 2013/0232843 | A1 | 9/2013 | Bajuelo | |
| 2014/0033592 | A1 | 2/2014 | Fiorucci | |
| 2014/0298704 | A1 | 10/2014 | Niccum | |
| 2014/0311008 | A1 | 10/2014 | McPhee | |
| 2014/0317985 | A1 | 10/2014 | Cauley, Jr. et al. | |
| 2015/0007480 | A1 | 1/2015 | Cauley, Jr. et al. | |
| 2015/0027023 | A1 | 1/2015 | Michael et al. | |
| 2015/0219415 | A1 | 8/2015 | Cauley, Jr. et al. | |
| 2015/0377573 | A1 | 12/2015 | Niccum | |
| 2016/0025437 | A1 * | 1/2016 | Slocum | F41A 9/83 42/87 |
| 2017/0051991 | A1 | 2/2017 | Cottrell et al. | |
| 2017/0051992 | A1 | 2/2017 | Cottrell et al. | |

FOREIGN PATENT DOCUMENTS

| | | | | |
|---|---|---|---|---|
| EP | 0205661 | A2 | 12/1986 | |
| IL | EP 0205661 | A2 * | 12/1986 | F41A 9/83 |

OTHER PUBLICATIONS

Unknown Author, AR Magazine speed loader, Mar. 29, 2015 or earlier, Double.sub.--MK, https://www.youtube.com/watch?v=vf76iM1E3fk.

Unknown Author, Podavach Multi-Caliber Magazine Loader, Mar. 27, 2016 or earlier, Podavach, http://podavach.com/.

Glockmeister, "Exploded Glock Drawing"—Glockmeister, Master of Perfection, Apr. 17, 2015, https://web.archive.org/web/20150417034813/http://www.glockmeister.com/Ex- plodedGlockDrawing.asp.

Unknown Author, Shop MagPacker Magazine Speed Loaders, Aug. 28, 2015 or earlier, https://www.magpacker.com/MagPacker-AR-15-AK-47-Magazine-Speed-L- oaders/c/1.

Unknown Author, Range Benchloader, Sep. 29, 2015 or earlier, Maglula Ltd., Israel.

Unknown Author, Thunderstruck Loaders, Jan. 4, 2016 or earlier, H & K Enterprises, Inc., http://thunderstruckloaders.com/.

Unknown Author, Lula, Jan. 4, 2016 or earlier, Maglula Ltd., http://www.maglula.com/product-category/rifle-mag-loaders/lula/.

Unknown Author, Smitload, Apr. 5, 2016 or earlier, Smithshot, http://www.smitshot.com/.

Unknown Author, McFadden Ultimate Clip Loader, Jun. 16, 2011 or earlier, Jarrett Maxwell, https://www.youtube.com/watch?v=nNPWFf5k8Qw.

Unknown Author, Lightnin' Grip Loader, Mar. 3, 2014 or earlier, McFadden Machine, https://www.youtube.com/watch?v=ZxLiUaGZnbw.

Unknown Author, Magazine Loaders for B&T MP9 and HK MP5, Sep. 3, 2015 or earlier, Александр Сергеевич, https://www.youtube.com/watch?v=himrMwJ7gn8.

Unknown Author, Podavach Loading vs. Manual Loading, Sep. 25, 2015 or earlier, U-Loader by Podavach: AR15 & AK Speed Loader, https://www.youtube.com/watch?v=f5UhR0QZu38.

Unknown Author, Podavach U-Loader Version 3.0 AR-15 & AK Magazine Speed Loader Review, Jan. 17, 2016 or earlier, U-Loader by Podavach: AR15 & AK Speed Loader, https://www.youtube.com/watch?v=Qmbb4r9g9Sg.

Unknown Author, Multi-caliber AK, AR-15 Magazine Speed Loader—Podavach Version 5.4, Feb. 20, 2016 or earlier, U-Loader by Podavach: AR15 & AK Speed Loader, https://www.youtube.com/watch?v=IrTmkNJmuXo.

Unknown Author, U-Loader by Podavach: Podavach Version 5.4—Multi-Platform Magazine Speed Loader for AK & AR15, Mar. 20, 2016 or earlier, U-Loader by Podavach: AR15 & AK Speed Loader, https://www.youtube.com/watch?v=-UROVSuPfHs.

Unknown Author, Podavach Mag loader v5.4, Apr. 1, 2016 or earlier, darink300zx, https://www.youtube.com/watch?v=_zw4iTiuvis.

Ray I, SmitLoad Glock Mag Loader, Apr. 21, 2016 or earlier, The Firearm Blog, https://www.thefirearmblog.com/blog/2016/04/21/225273/.

Unknown Author, SmitShot has a brand new speed loader!! Available for Glock 9mm soon. Keep posted for all other upcoming models!, Sep. 14, 2016, or earlier, Instagram, https://www.instagram.com/p/BKW2gjmgn4d/.

Unknown Author, How a Mannlicher M1905 works, Nov. 19, 2017, or earlier, Si vis pacem , para bellum., https://www.youtube.com/watch?v=Ob820VDgPQE.

Unknown Author, Small Arms of WWI Primer 026: Austro-Hungarian Roth-Kmka M.7 Pistol, May 24, 2016, or earlier, C&Rsenal., https://www.youtube.com/watch?v=MQTexxPSszU.

(56) References Cited

OTHER PUBLICATIONS

Unknown Author, Strip Lula. Can Loading AR Mags be Easier Than This?, Jun. 27, 2014, or earlier, beelikestowatch, , https://www.youtube.com/watch?v=5zTUdk4ZF8Y.

Defendant's Answer, Defenses, and Counterclaims to Plaintiffs Amended Complaint; *Plate, LLC* v. *Rctenn, LLC*, United States District Court Middle District of Tennessee, Case No. 3:18-cv-806; Feb. 19, 2019.

Defendants' Answer, Defenses, and Counterclaims to Re-Filed Fourth Amended Complaint; *Plate, LLC and Christopher Plate* v. *Elite Tactical Systems, LLC, et al.*, United States District Court Eastern District of Tennessee, Case No. 3:18-cv-265; Sep. 17, 2019.

Defendant's Memorandum in Support of Motion for Summary Judgment; *Plate, LLC* v. *Rctenn, LLC*, United States District Court Middle District of Tennessee, Case No. 3:18-cv-806; Jan. 17, 2020.

Defendant's Reply Brief in Support of Motion of Summary Judgment; *Plate, LLC* v. *Rctenn, LLC*, United States District Court Middle District of Tennessee, Case No. 3:18-cv-806; Feb. 28, 2020.

Motion to Continue Hearing; *Plate, LLC and Christopher Plate* v. *Elite Tactical Systems, LLC, et al.*, United States District Court Eastern District of Tennessee, Case No. 3:18-cv-265; Jul. 12, 2018.

Response to Plaintiffs Motion for a Preliminary Injunction; *Plate, LLC and Christopher Plate* v. *Elite Tactical Systems, LLC, et al.*, United States District Court Eastern District of Tennessee, Case No. 3:18-cv-265; Jul. 20, 2018.

Defendants' Answer, Defenses, and Counterclaims to Second Amended Complaint; *Plate, LLC and Christopher Plate* v. *Elite Tactical Systems, LLC, et al.*, United States District Court Eastern District of Tennessee, Case No. 3:18-cv-265; Aug. 30, 2018.

Defendants' First Amended Answer, Defenses, and Counterclaims to Second Amended Complaint; *Plate, LLC and Christopher Plate* v. *Elite Tactical Systems, LLC, et al.*, United States District Court Eastern District of Tennessee, Case No. 3:18-cv-265; Sep. 20, 2018.

Defendants' Answer, Defenses, and Counterclaims to Third Amended Complaint; *Plate, LLC and Christopher Plate* v. *Elite Tactical Systems, LLC, et al.*, United States District Court Eastern District of Tennessee, Case No. 3:18-cv-265; Feb. 13, 2019.

Defendants' Amended Answer, Defenses, and Counterclaims to Third Amended Complaint; *Plate, LLC and Christopher Plate* v. *Elite Tactical Systems, LLC, et al.*, United States District Court Eastern District of Tennessee, Case No. 3:18-cv-265; Mar. 6, 2019.

Defendants' Opening Claim Construction Brief; *Plate, LLC and Christopher Plate* v. *Elite Tactical Systems, LLC, et al.*, United States District Court Eastern District of Tennessee, Case No. 3:18-cv-265; *Plate, LLC* v. *Rctenn, LLC*, United States District Court Middle District of Tennessee, Case No. 3:18-cv-806; Apr. 5, 2019.

Defendants' Responsive Claim Construction Brief; *Plate, LLC and Christopher Plate* v. *Elite Tactical Systems, LLC, et al.*, United States District Court Eastern District of Tennessee, Case No. 3:18-cv-265; *Plate, LLC* v. *Rctenn, LLC*, United States District Court Middle District of Tennessee, Case No. 3:18-cv-806; May 3, 2019.

Defendants' Response to Plaintiff's Rule 15 Motion for Leave to File Fourth Amended Complaint; *Plate, LLC and Christopher Plate* v. *Elite Tactical Systems, LLC, et al.*, United States District Court Eastern District of Tennessee, Case No. 3:18-cv-265; Jul. 15, 2019.

Motion; *Plate, LLC and Christopher Plate* v. *Elite Tactical Systems, LLC, et al.*, United States District Court Eastern District of Tennessee, Case No. 3:18-cv-265; Jul. 25, 2019.

Defendants' Answer, Defenses, and Counterclaims to Fourth Amended Complaint *Plate, LLC and Christopher Plate* v. *Elite Tactical Systems, LLC, et al.*, United States District Court Eastern District of Tennessee, Case No. 3:18-cv-265; Aug. 15, 2019.

Defendants' Response to Plaintiffs' Motion to Compel; *Plate, LLC and Christopher Plate* v. *Elite Tactical Systems, LLC, et al.*, United States District Court Eastern District of Tennessee, Case No. 3:18-cv-265; Jan. 17, 2020.

Response to Plaintiffs' Motion to Exclude Derek Watkins; *Plate, LLC and Christopher Plate* v. *Elite Tactical Systems, LLC, et al.*, United States District Court Eastern District of Tennessee, Case No. 3:18-cv-265; Jan. 24, 2020.

Defendants' Response to Plaintiffs' Motion for Limited Purpose Extension to Pleading Amendment Deadline; *Plate, LLC and Christopher Plate* v. *Elite Tactical Systems, LLC, et al.*, United States District Court Eastern District of Tennessee, Case No. 3:18-cv-265; Mar. 12, 2020.

Defendants' Response in Opposition to Plaintiffs' Rule 15 Motion for Leave to File Fifth Amended Complaint; *Plate, LLC and Christopher Plate* v. *Elite Tactical Systems, LLC, et al.*, United States District Court Eastern District of Tennessee, Case No. 3:18-cv-265; Apr. 28, 2020.

Defendants' Motion to Continue Claim Construction Proceedings and to Stay the Case; *Plate, LLC and Christopher Plate* v. *Elite Tactical Systems, LLC, et al.*, United States District Court Eastern District of Tennessee, Case No. 3:18-cv-265; Apr. 28, 2020.

Defendant's Answer, Defenses, and Counterclaims to Plaintiffs Complaint; *Plate, LLC* v. *Rctenn, LLC*, United States District Court Middle District of Tennessee, Case No. 3:18-cv-806; Sep. 27, 2018.

Defendant's Motion to Stay; *Plate, LLC* v. *Rctenn, LLC*, United States District Court Middle District of Tennessee, Case No. 3:18-cv-806; Oct. 5, 2018.

Defendant's Memorandum in Support of Motion to Stay; *Plate, LLC* v. *Rctenn, LLC*, United States District Court Middle District of Tennessee, Case No. 3:18-cv-806; Oct. 5, 2018.

Defendant's Reply Brief in Support of its Motion to Stay; *Plate, LLC* v. *Rctenn, LLC*, United States District Court Middle District of Tennessee, Case No. 3:18-cv-806; Nov. 16, 2018.

Amended Certificate of Service; *Plate, LLC* v. *Rctenn, LLC*, United States District Court Middle District of Tennessee, Case No. 3:18-cv-806; Feb. 21, 2019.

Defendant's Motion for Leave to File Summary Judgement Briefs in Excess Page Limits Under Local Rules; *Plate, LLC* v. *Rctenn, LLC*, United States District Court Middle District of Tennessee, Case No. 3:18-cv-806; Jan. 3, 2020.

Motion for Leave to File Under Seal; *Plate, LLC* v. *Rctenn, LLC*, United States District Court Middle District of Tennessee, Case No. 3:18-cv-806; Jan. 10, 2020.

Motion to Exclude Expert Opinion Testimony of Dr. Grune; *Plate, LLC* v. *Rctenn, LLC*, United States District Court Middle District of Tennessee, Case No. 3:18-cv-806; Jan. 10, 2020.

Memorandum in Support of Motion to Exclude Expert Opinion Testimony of Dr. Grune; *Plate, LLC* v. *Rctenn, LLC*, United States District Court Middle District of Tennessee, Case No. 3:18-cv-806; Jan. 10, 2020.

Defendant's Motion for Summary Judgment; *Plate, LLC* v. *Rctenn, LLC*, United States District Court Middle District of Tennessee, Case No. 3:18-cv-806; Jan. 17, 2020.

Defendant's Statement of Undisputed Material Facts in Support of Motion for Summary Judgment; *Plate, LLC* v. *Rctenn, LLC*, United States District Court Middle District of Tennessee, Case No. 3:18-cv-806; Jan. 17, 2020.

Defendant's Unopposed Motion for Leave to File Reply Brief with Excess Pages; *Plate, LLC* v. *Rctenn, LLC*, United States District Court Middle District of Tennessee, Case No. 3:18-cv-806; Jan. 29, 2020.

Defendant's Reply in Support of Motion to Exclude Expert Opinion Testimony of Dr. Guerry Grune; *Plate, LLC* v. *Rctenn, LLC*, United States District Court Middle District of Tennessee, Case No. 3:18-cv-806; Jan. 31, 2020.

Defendant's Response in Opposition to Plaintiffs Motion for Partial Summary Judgment; *Plate, LLC* v. *Rctenn, LLC*, United States District Court Middle District of Tennessee, Case No. 3:18-cv-806; Feb. 14, 2020.

Defendant's Response to Plaintiffs Statement of Undisputed Material Facts; *Plate, LLC* v. *Rctenn, LLC*, United States District Court Middle District of Tennessee, Case No. 3:18-cv-806; Feb. 14, 2020.

Defendant's Reply Statement of Undisputed Material Facts in Support of Motion for Summary Judgment; *Plate, LLC* v. *Rctenn, LLC*, United States District Court Middle District of Tennessee, Case No. 3:18-cv-806; Feb. 28, 2020.

(56) References Cited

OTHER PUBLICATIONS

Defendant's Motion for Leave to File Supplemental Brief in Support of Motion for Summary Judgment; *Plate, LLC* v. *Rctenn, LLC*, United States District Court Middle District of Tennessee, Case No. 3:18-cv-806; Apr. 22, 2020.
Defendant's Response to Plaintiffs Emergency Motion to Dissolve Protective Order and Unseal All Filings; *Plate, LLC* v. *Rctenn, LLC*, United States District Court Middle District of Tennessee, Case No. 3:18-cv-806; Jun. 3, 2020.
Unknown Author, Magazine Loaders for B&T MP9 and HK MP5, Sep. 3, 2015, Александр Сергеевич, https://www.youtube.com/watch?v=himrMwJ7gn8.
Unknown Author, So the cats out of the bag., Dec. 23, 2016, etsgroup, https://www.instagram.com/p/BOXrixQjfBT/.
Unknown Author, Custom AR-15 Magazine Loader Mar. 27, 2016, Buck Shot Sporting Goods, https://gun.deals/product/custom-ar-15-magazine-loader-wooden-cnc-usa-made-free-ship-no-cc-fee-150.
Unknown Author, AR-15, 30 Round Magazine Speed Loader, Nov. 26, 2015, PopsCabinetShop, https://www.etsy.com/listing/239467167/ar-15-30-round-magazine-speed-loader?ref=shop-home-active-3.
Unknown Author, AR .223/5.56 speed loader, Mar. 27, 2016, 903plasmaworksdotcom, https://www.etsy.com/listing/286400047/ar-223556-speed-loader?ref=market.
Unknown Author, AR-15 Mag loader, Mar. 27, 2016, JarednCece, https://www.etsy.com/listing/265952088/ar-15-mag-loader?ref=shop-review.
Unknown Author, AR 15 Magazine Speed Loader !!Free Shipping!!, Mar. 27, 2016, RedRockSignworks, https://www.etsy.com/listing/271664006/ar-15-magazine-speed-loader-free?ga-order=most-relevant&ga-search-type=all&ga-view-type=gallery&ga-search-query=ar15%20mag%20loader&ref=sr-gallery-4.
Unknown Author, Handcrafted AR15 Mag loader, Mar. 27, 2016, MountainViewWoodshop, https://www.etsy.com/listing/265031238/handcrafted-ar15-mag-loader-summer?utm-source=google&utm-medium=cpc&utm-campaign=shopping-us-branded-toys-and-games&utm-custom1=249b116d-2059-4def-a8a8-0eacd6db60d6&gclid=CICc3-CK4csCFcokhgodSmEGLQ.
Unknown Author, (Patent Pending) Mag-Packer, AR15 model, Jul. 13, 2015, Mag Packer, https://www.youtube.com/watch?v=0JChoITsm90.
Office Action dated Jan. 6, 2015 in U.S. Appl. No. 13/931,953.

* cited by examiner

FIG. 7a
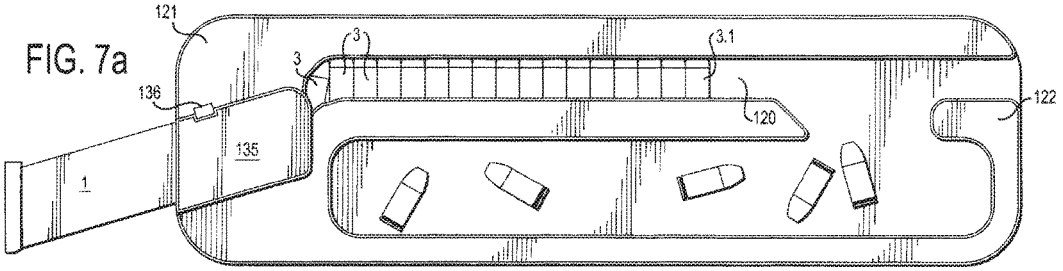
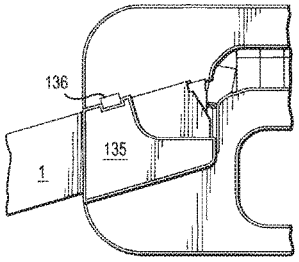
FIG. 7b
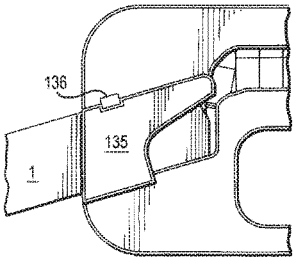
FIG. 7c
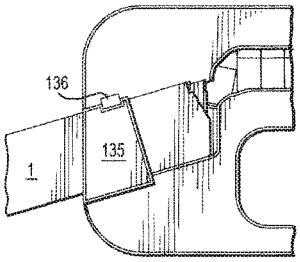
FIG. 7d

MAGAZINE LOADER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED DOCUMENTS

This application is related to, incorporates by reference in their entireties, and claims the priority benefits of the following documents: (1) U.S. patent application Ser. No. 15/294,770, entitled "Magazine Loader," and filed on Oct. 16, 2016 by Christopher Andrew Plate, which incorporated by reference and claimed the priority benefit of U.S. patent application Ser. No. 14/979,051, now U.S. Pat. No. 9,618,286, which incorporated by reference and claimed the priority benefit of U.S. patent application Ser. No. 14/869,502 entitled "Ammunition Magazine Loader" and filed on Sep. 29, 2015 by Christopher Andrew Plate; (2) U.S. Provisional Patent Application Ser. No. 62/473,994, entitled "Pistol Loader, Method, and System" and filed on Mar. 20, 2017 by Christopher Andrew Plate; and (3) U.S. Provisional Patent Application Ser. No. 62/478,090, entitled "Another Pistol Loader, Method, and System" and filed on Mar. 29, 2017 by Christopher Andrew Plate.

FIELD OF THE INVENTION

The present invention relates to ammunition magazines, and more specifically, to magazines loaders.

BACKGROUND OF THE INVENTION

A magazine is a device used to sequentially provide rounds of ammunition to a firearm. A magazine loader is a device to facilitate the loading of rounds into an ammunition magazine.

SUMMARY OF THE INVENTION

It is an object of the present invention to provide a magazine loader and a method of using the same.

It is another object of the present invention to provide a magazine loader and method of using the same that overcomes at least one deficiency in the prior art.

The present invention provides a magazine loader configured to load a plurality of ammunition rounds into a magazine having a magazine shape, with each round respectively including first and second round ends and a pivot point, with the magazine loader having a main body, a rounds recess, and a magazine recess.

In an exemplary embodiment of the present invention, a main body can include a first main body end, a second main body end, and a main body length.

In exemplary aspects, a rounds recess can extend along the main body length, and can have first and second rounds recess ends, a rounds recess bottom, first and second rounds recess sides, first and second rounds recess ledges, a first rounds cavity (defined by the rounds recess bottom, first rounds recess side, and first rounds recess ledge), and a second rounds cavity (defined by the rounds recess bottom, second rounds recess side, and second rounds recess ledge). Further, the rounds recess can be shaped to hold the plurality of rounds therein with each respective first rounds end positioned within the first rounds cavity and with each second rounds end positioned within the second rounds cavity.

In another exemplary aspect, a magazine recess can be positioned at the first main body end. Further, the magazine recess can be complementarily shaped to the magazine shape to assist in retaining the magazine in a fixed position within the magazine recess.

In further exemplary aspects, the first rounds recess end can open into the magazine recess, the second rounds recess side can terminate at a first downwardly angled portion that opens into the magazine recess, and the first rounds recess side can include a second downwardly angled portion. Accordingly, with the magazine positioned within the magazine recess and as the plurality of rounds are moved towards the magazine, the pivot point of each of the plurality of rounds can successively contact the second downwardly angled portion to pivot the second round end of each successive round towards the magazine, and the second round end of each successive round can pass over the first downwardly angled portion and into the magazine, which results in the plurality of rounds moved into the magazine via a single force vector applied to the plurality of rounds.

In exemplary optional aspects, the first downwardly angled portion can be provided with a convex shape and/or the second downwardly angled portion can be provided with a concave shape. Further optionally, for example and not in limitation, the first downwardly angled portion can include an about 0.43 inch radius; and/or the second downwardly angled portion can include an about 0.71 inch radius.

In a further exemplary optional aspect, the first rounds recess side can include an additional downwardly angled portion. Also optionally, such a portion can be provided with a concave shape. And further optionally, such a portion can include an about 0.38 inch radius.

In another exemplary optional aspect, the second rounds recess side can include at least one additional downwardly angled portion. Also optionally, such an at least one portion can be provided with a concave or convex shape. Further optionally, such an at least one portion can include an about 0.80 inch radius or an about 1.22 inch radius.

These and other exemplary aspects and embodiments of the present invention are further described herein.

BRIEF DESCRIPTION OF THE DRAWINGS

FIG. 7a illustrates an exemplary loader configured for loading a single-feed magazine.

FIG. 7b illustrates an exemplary loader with an exemplary magazine recess having magazine retention cover.

FIG. 7c illustrates an exemplary loader with an exemplary magazine recess having another magazine retention cover.

FIG. 7d illustrates an exemplary loader with an exemplary magazine recess having yet another magazine retention cover.

DETAILED DESCRIPTION

Figure 1A:
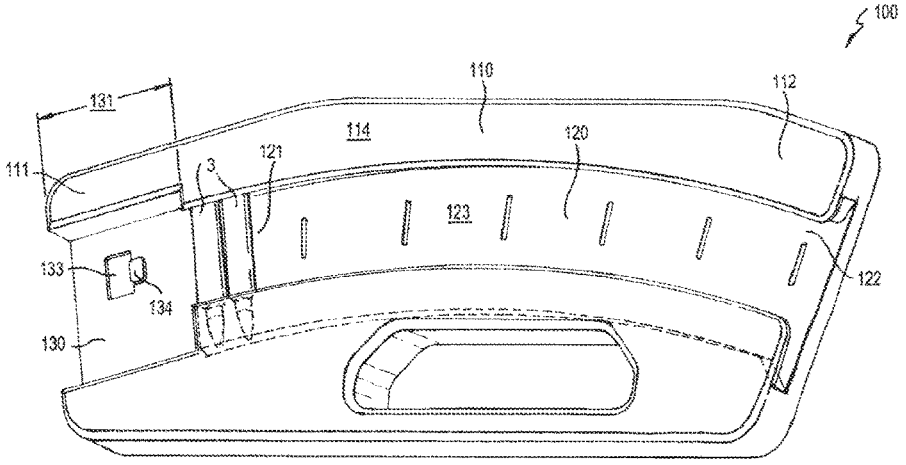
FIG. 1a illustrates an exemplary ammunition magazine loader according to the present invention, in which a loader includes a main body, a rounds recess, and a magazine recess.

It should be noted that this disclosure includes a plurality of embodiments, with a plurality of elements and aspects, and such elements and aspects need not necessarily be interpreted as being conjunctively required by one or more embodiments of the present invention. Rather, all combinations of the one or more elements and/or aspects can enable a separate embodiment of the present invention, which may be claimed with particularity in this or any one or more future filed Non-Provisional Patent Applications. Moreover, any particular materials, structures, and/or sizes disclosed herein, whether expressly or implicitly, are to be construed strictly as illustrative and enabling, and not necessarily limiting. Therefore, it is expressly set forth that such materials, structures, and/or sizes independently or in any combination thereof, are merely illustratively representative of one or more embodiments of the present invention and are not to be construed as necessary in a strict sense.

Further, to the extent the same element or aspect is defined differently within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

According to the present invention, a magazine loader can be formed from any one or more materials or combinations of materials, such as one or more of plastic, rubber, wood, metal, a crystalline material, or any other man-made or naturally occurring material, for example and not in limitation, insofar as the same if functionally consistent with the invention as described. Further, a loader can be manufactured in any one or more functionally compatible manners, such as through molding, machining, etc.

Notably, the present invention includes particular structural aspects described herein that allow for particular pivoting of rounds for subsequent loading into a magazine, such as a single feed magazine, for example and not in limitation.

FIGS. 1a-2b illustrate exemplary embodiments of a magazine loader 100, which can be configured to load a plurality of ammunition rounds 3 into a magazine 1 having a magazine shape, such as a straight or curved parallelepiped for example and not in limitation, and a magazine length 2.

In an exemplary aspect, a round 3, which includes the case and projectile, can include a first round end 4 and a second round end 5. Notably, a round 3 can be a live or blank round.

Figure 1B:
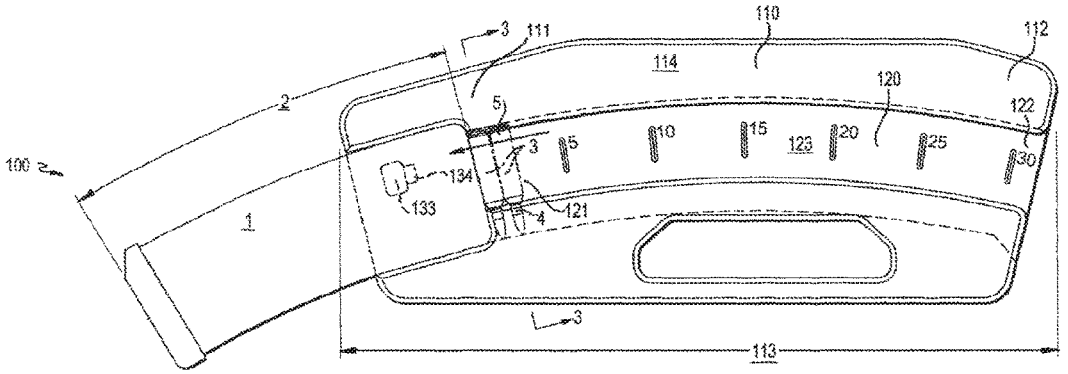
FIG. 1b illustrates such an exemplary ammunition magazine loader with an exemplary magazine positioned within the magazine recess.
Figure 2A:
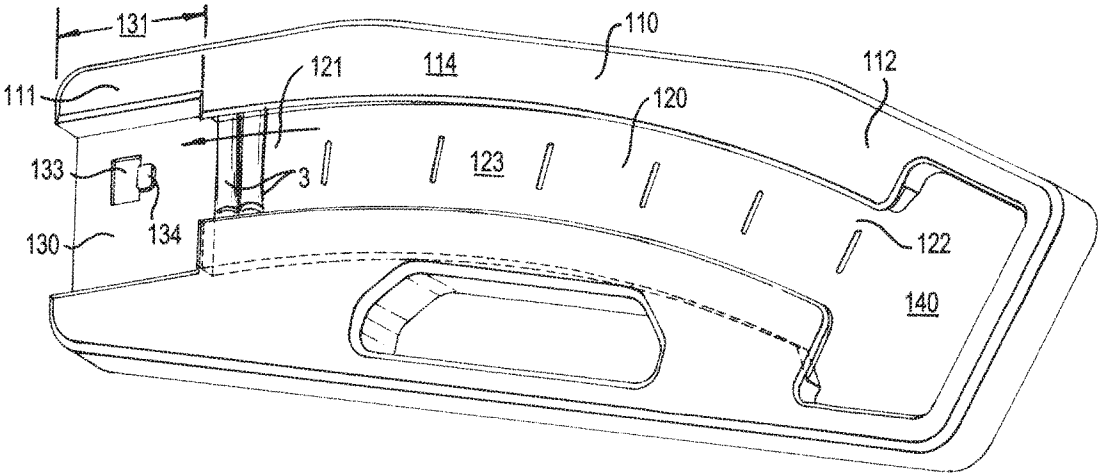
FIG. 2a illustrates an exemplary ammunition magazine loader according to the present invention, in which a loader includes a main body, a rounds recess, a magazine recess, and an optional rounds retention recess.
Figure 2B:
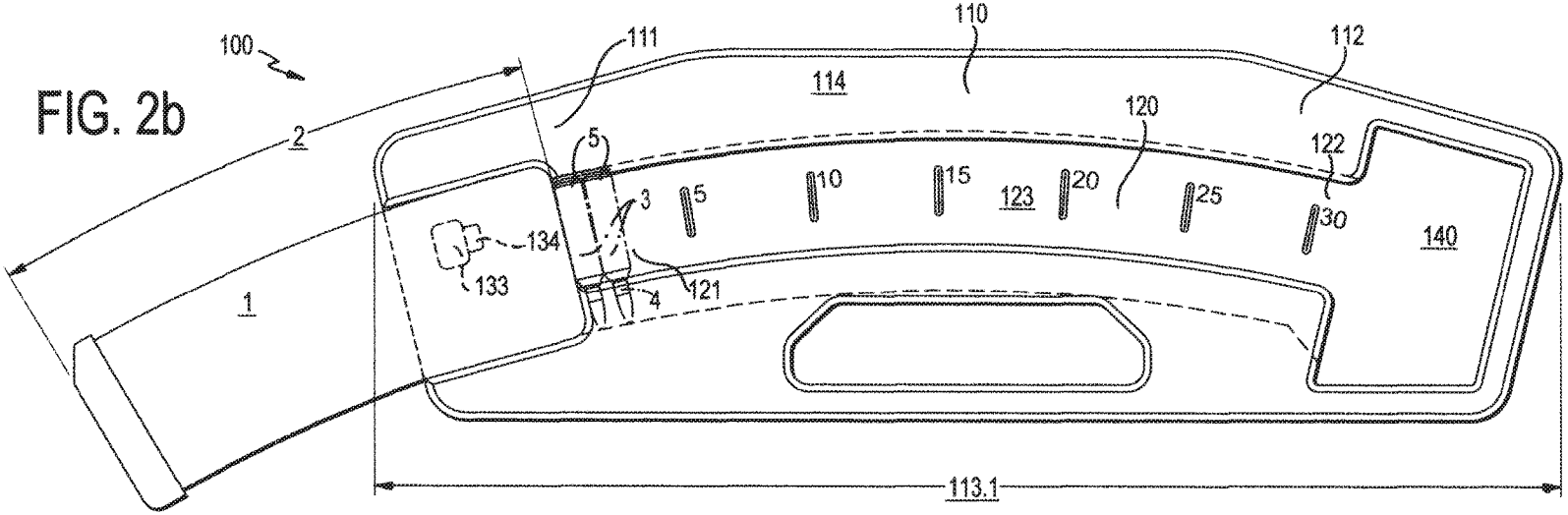
FIG. 2b illustrates such an exemplary ammunition magazine loader having an optional rounds retention recess, and with an exemplary magazine positioned within the magazine recess.

FIGS. 1a and 1b illustrate an exemplary loader 100 having a main body 110, a rounds recess 120, and a magazine recess 130; whilst FIGS. 2a and 2b illustrate another exemplary embodiment, in which loader 100 can further include an optional rounds retention recess 140.

As illustratively shown in FIGS. 1a-2b, main body 110 can include a first main body end 111, a second main body end 112, and a main body length 113.

As further illustratively shown, rounds recess 120 can extend along main body length 113, and can include a first rounds recess end 121, a second rounds recess end 122, a rounds recess bottom 123, a first rounds recess side 124, a second rounds recess side 125, a first rounds recess ledge 126, and a second rounds recess ledge 127.

Figure 3A:
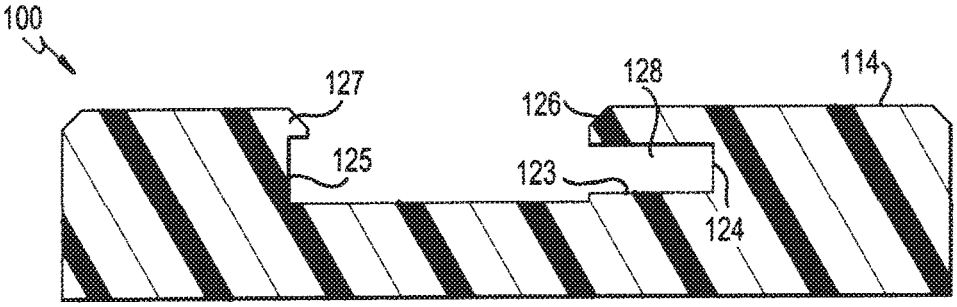
FIG. 3a illustrates a cross-section view of an exemplary rounds recess.

As illustrated in FIG. 3a, rounds recess bottom 123, first rounds recess side 124, and first rounds recess ledge 126 cooperatively define a first rounds cavity 128 positioned, at least partially, between the rounds recess bottom and the first rounds recess ledge; and rounds recess bottom 123, second rounds recess side 125, and second rounds recess ledge 127 define a second rounds cavity 129 positioned at least partially between the rounds recess bottom and the second rounds recess ledge.

As further illustrated in FIG. 3a, rounds recess 120 can be complementarily shaped to rounds 3 to allow the rounds to slidably move within at least a portion of the rounds recess and to exit through first rounds recess end 122. Notably, rounds recess 120 can be structurally configured such that rounds 3 can be introduced into the rounds recess via at least one of first rounds recess end 121, second rounds recess end 122, and a portion therebetween, all of which are deemed equivalents. Further notably, rounds recess 120 can be provided with any functionally compatible shape, and accordingly, any bottom or side described herein can include any combination of one or more linear and/or curvilinear shapes, including any contiguous positioned side, sides, and/or bottom being similarly, dissimilarly, or identically curvilinear.

Figure 3B:
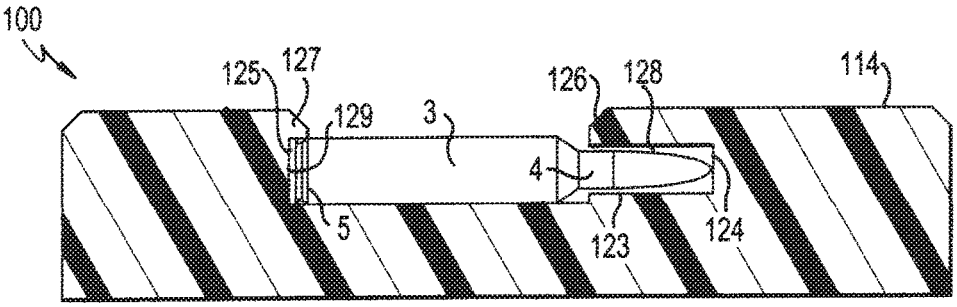
FIG. 3b illustrates a cross-section view of an exemplary rounds recess having a live round positioned therein.
Figure 3C:
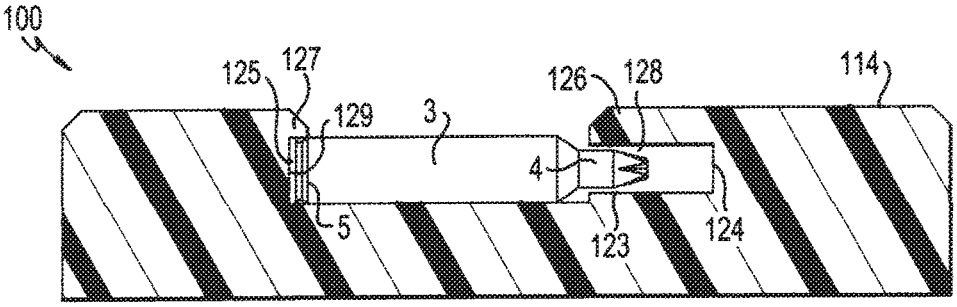
FIG. 3c illustrates an exemplary rounds recess having a blank round positioned therein.
Figure 4:
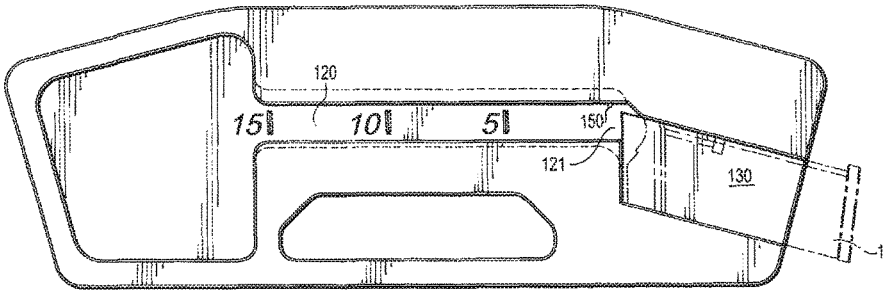
FIG. 4 illustrates an exemplary loader having a rounds abutment.

As illustrated in FIGS. 3b and 3c, with rounds 3 held within rounds recess 120, each first round end 4 can be positioned within first rounds cavity 128 and under first rounds recess ledge 126 and each second round end 5 can be positioned within second rounds cavity 129 and under second rounds recess ledge 127. It should be noted, however, that to the extent desired and functionally compatible, loader 100 can be configured to toggle such arrangement such that first and second case ends 4, 5 can be positioned in association with second and first case cavities 129, 128, respectively.

As illustrated in FIG. 1a-2b, loader 100 further includes a magazine recess 130 that can be positioned at first main body end 111. As shown, magazine recess 130 includes a magazine recess length 131 that can be less than magazine length 2. Accordingly, in an exemplary aspect, the present invention is not limited to a maximum-lengthed magazine, which can arise when a magazine recess is configured to encapsulate the entire length of a magazine, which can optionally be provided to the extent desired. Further, in another exemplary aspect, due to the length consideration above, main body length 113 can be reduced, as the main body length would not require inclusion of the full length of a magazine, rendering the overall length of the invention less and therefore more conveniently transportable and/or storable.

As further illustrated, magazine recess 130 can be complementarily shaped to the shape of magazine 1 so as to facilitate retention of the magazine in a fixed position within the magazine recess during loading. Accordingly, retention can be effectuated via a friction fit between magazine 1 and a portion of main body 110 that defines magazine recess 130. Further, alternatively or in combination, retention can be facilitated with at least one of a magazine retention depression 133 and a magazine retention abutment 134, which can retentionally engage a compatibly configured portion of magazine 1, such as a notch, for example and not in limitation.

Also illustrated, second rounds recess end 122 can be positioned at second main body end 112, and optionally, shaped to accept rounds 3 into rounds recess 120. Accordingly, as first rounds recess end 121 opens into magazine recess 130, when magazine 1 is positioned within the magazine recess, rounds 3 can be slidably moved out of rounds recess 120 through the first rounds recess end and into magazine 1. For example and not in limitation, a user can utilize their finger or any other desired structure that fits within at least a portion of rounds recess 120 to push a last round 3b (see FIGS. 5c-5f) towards magazine 1, such that the last round, and any other rounds between that round and the first rounds recess end 121, slidably moves out of the rounds recess, through the first rounds recess end, and into the magazine.

In another exemplary aspect, FIGS. 7a-7d and 8 illustrate additional exemplary embodiments of the present invention that can accommodate the loading of a single feed magazine. As illustratively shown in FIGS. 7a-7d, as rounds 3 positioned within rounds recess 120 are moved towards magazine 1, each round can successively pivot, such that each second round end 5 is angled towards the magazine. Notably, FIGS. 7a-7d further illustrate optional magazine recess cover 135, which can be provided as a separate structure or integral with loader 100 and can cover a portion or all of the magazine recess. Further notably, optionally, a magazine retention system, such as those integrated with Glock™ firearms can be provided, along with a magazine release 136.

Figure 5A:
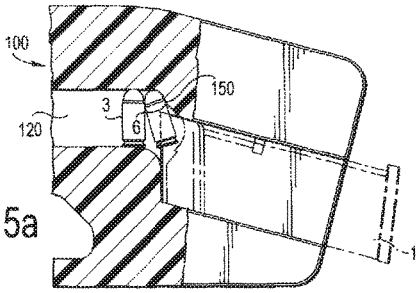
FIG. 5a illustrates an exemplary rounds abutment provided as a portion of an exemplary first rounds recess side that is inwardly curved.
Figure 5B:
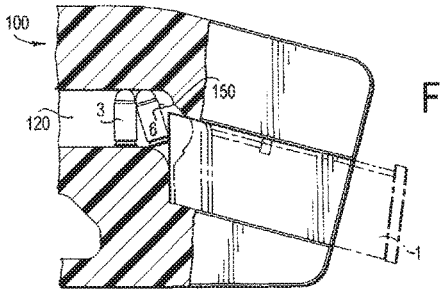
FIG. 5b illustrates an exemplary rounds abutment provided as a post.
Figure 5C:
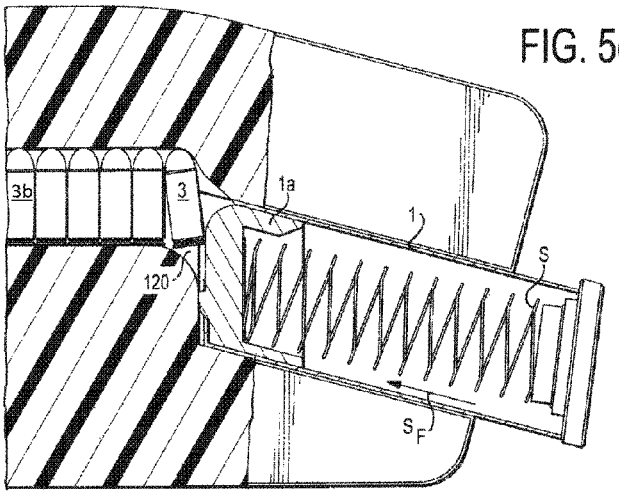
FIG. 5c illustrates an exemplary empty magazine being loaded with a round that abuts and forces a follower downwardly against a spring force as the round enters the magazine.
Figure 5D:
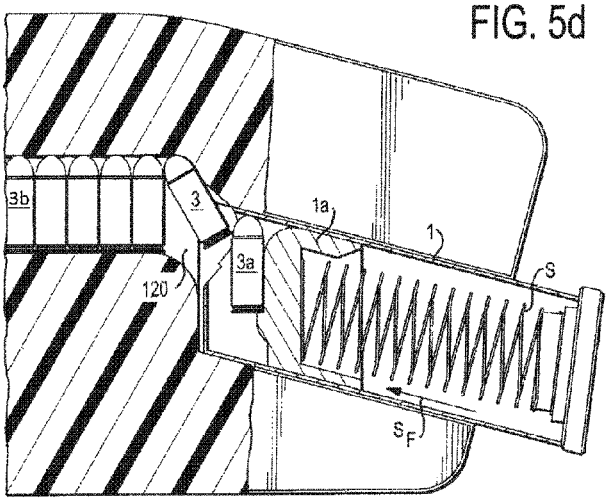
FIG. 5d illustrates an exemplary magazine having a pre-loaded round being loaded with another round that abuts and forces the pre-loaded round and a follower downwardly against a spring force as the other round enters the magazine.
Figure 5E:
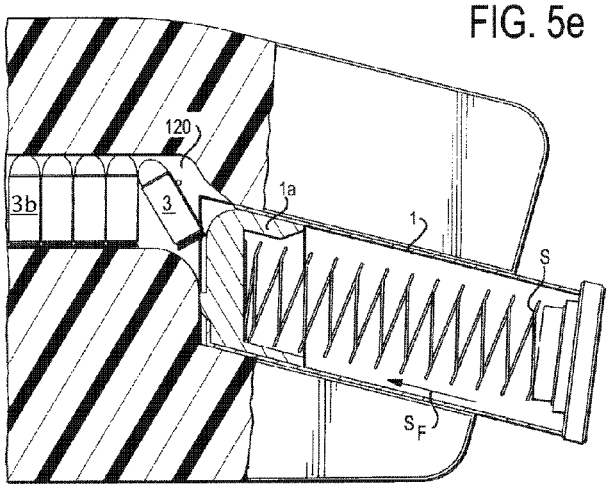
FIG. 5e illustrates an exemplary empty magazine being loaded with a round that abuts and forces a follower downwardly against a spring force as the round enters the magazine.
Figure 5F:
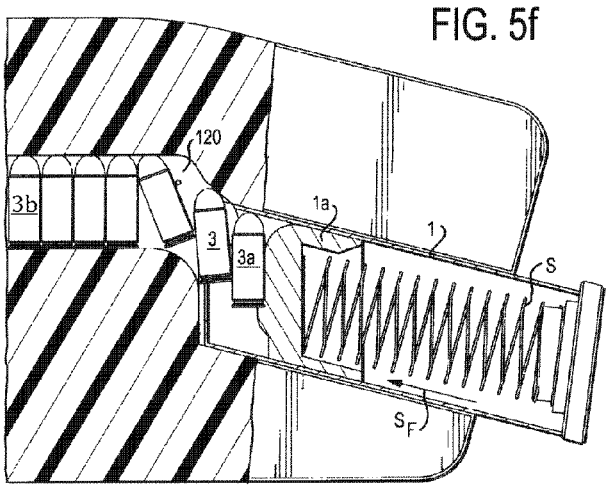
FIG. 5f illustrates an exemplary magazine having a pre-loaded round being loaded with another round that abuts and forces the pre-loaded round and a follower downwardly against a spring force as the other round enters the magazine.
Figure 6:
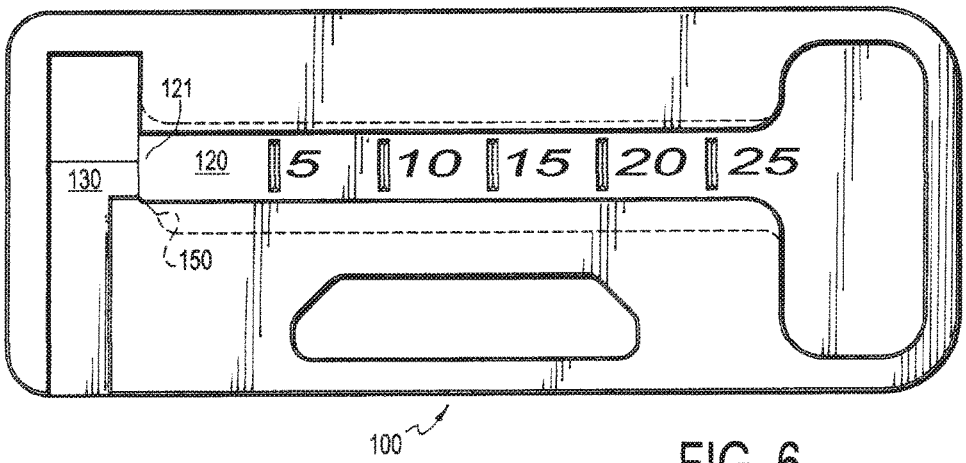
FIG. 6 illustrates an exemplary loader configured for loading an exemplary magazine.
Figure 6A:
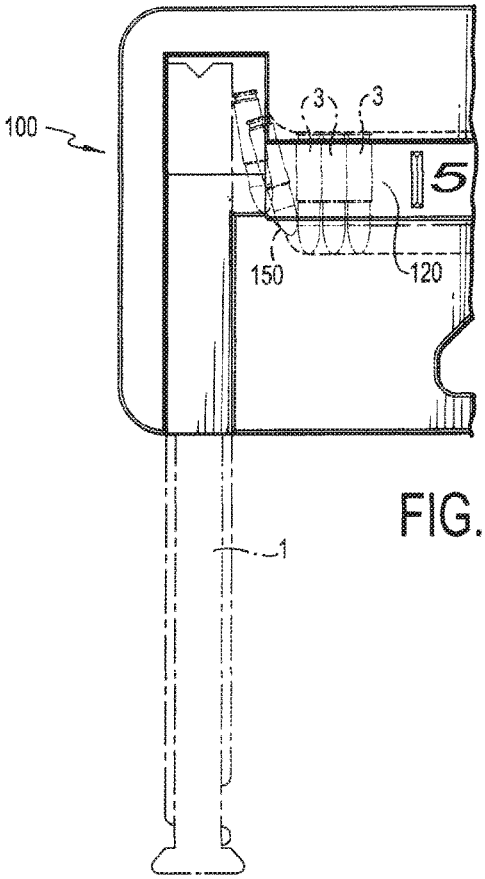
FIG. 6a illustrates an exemplary loader with exemplary rounds pivoting about a portion of an exemplary first rounds recess side that is inwardly curved.

FIGS. 5a and 5b illustratively show loader 100 being configured to load a common single feed magazine, which can be, for example and not in limitation, a GLOCK™ compatible magazine; whilst FIGS. 6 and 6a illustratively show a loader being configured to load a P90™ magazine.

As illustrated in FIGS. 5c-5f, when an exiting round 3 exits rounds recess 120, the exiting round abuts and forces at least one of a follower la and a pre-loaded round 3a in magazine 1 downwardly into the magazine against a spring force $S_F$ provided by spring S as the exiting round enters the magazine.

Figure 8:
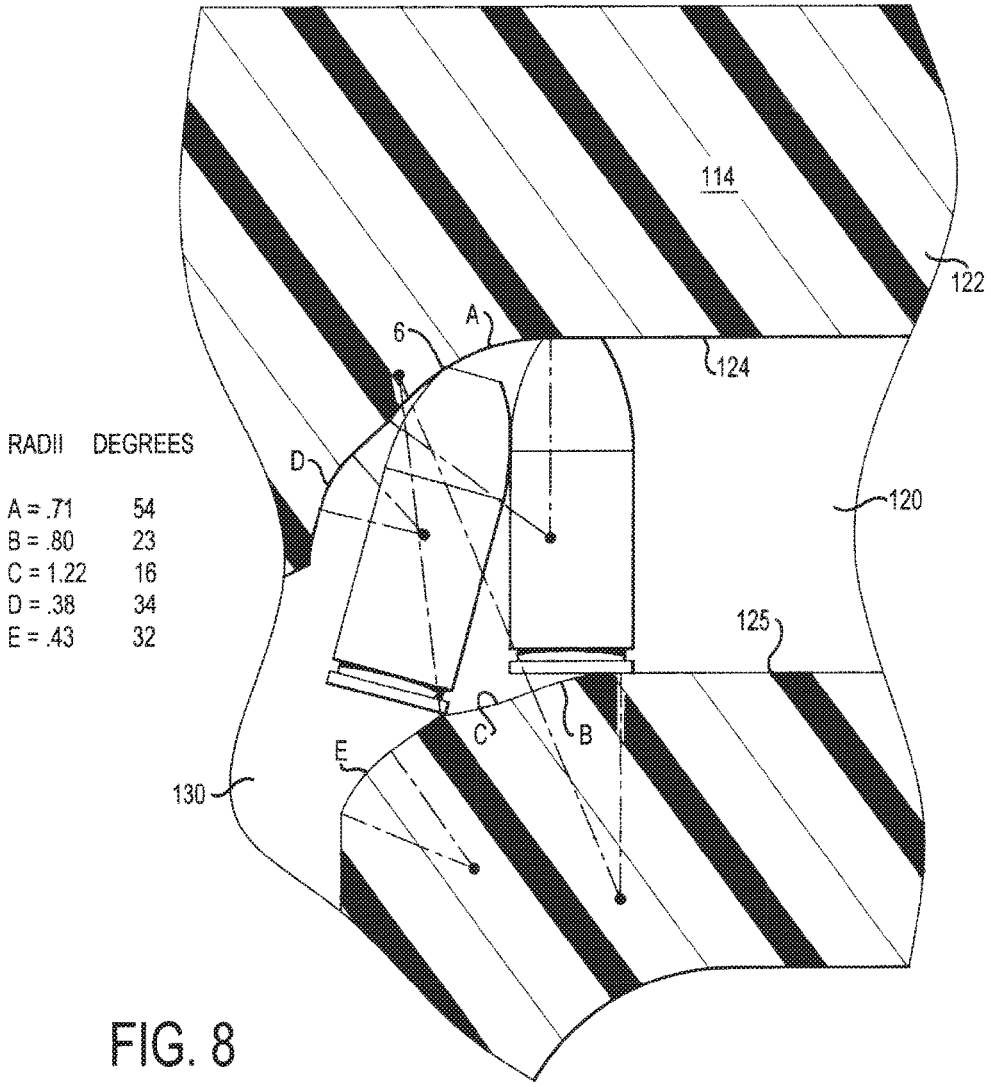
FIG. 8 illustrates exemplary first and second rounds recess walls having exemplary downwardly angled portions.
Figure 9:
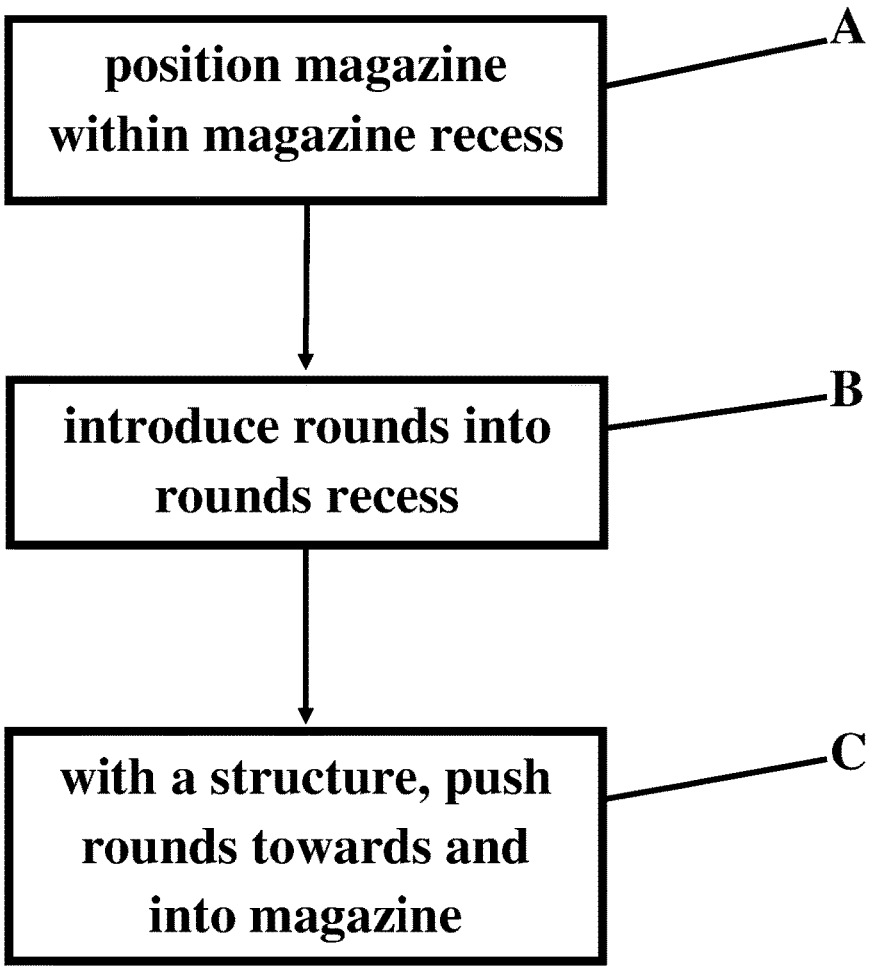
FIG. 9 illustrates exemplary method steps of loading an ammunition magazine with a magazine loader.

FIG. 8 illustrates an exemplary rounds recess 120 having first and second rounds recess sides 124, 125 that include downwardly angled portions A-E, which can effectuate such pivoting of rounds 3. In an exemplary aspect, a loader can be provided with any combination of angled portions A-E. Notably, the language "downwardly angled" is intended to represent any angle of first recess side 124 that is angled towards second recess side 125, and any angle of the second recess side that is angled away from the first recess side. Further notably, any angled portion described herein can be provided with a concave, linear, convex, or irregular shape.

In another exemplary aspect, first rounds recess side 124 can be provided with a downwardly angled portion A positioned between magazine recess 130 and second main body end 122, and second rounds recess side 125 can be provided with another downwardly angled portion E that opens into magazine recess 130. Accordingly, as rounds 3 are moved towards magazine 1, a pivot point 6 of each round can contact the downwardly angled portion A to pivot the second round end 5 of the round towards the magazine and over the other downwardly angled portion E, before the round subsequently enters the magazine.

As illustrated in FIG. 8, in optional exemplary aspects, downwardly angled portion A can be provided with a convex shape and/or downwardly angled portion E can be provided with a concave shape. In further optional exemplary aspects, downwardly angled portion A can include an about 0.43 inch radius and/or downwardly angled portion E can include an about 0.71 inch radius.

As further illustrated in FIG. 8, in yet additional optional exemplary aspects, second rounds recess side 125 can further include one or two additional downwardly angled portions B, C positioned between downwardly angled portion E and second main body end 122. Notably, downwardly angled portion B is optionally provided, the portion B can optionally include a convex shape, and even further optionally, can include an about 0.80 inch radius. Further notably, where downwardly angled portion C is optionally provided, the portion C can optionally include a concave share, and even further optionally, can include an about 1.22 inch radius.

As still further illustrated in FIG. 8, in a further optional exemplary aspect, first rounds recess side 124 can further include another downwardly angled portion D positioned between portion A and magazine recess 130. Notably, where downwardly angled portion D is optionally provided, the portion D can optionally include a concave shape, and even further optionally, can include an about 0.43 inch radius.

Notably, while the present invention contemplates the provisioning of any combination of portions A-E, with various positions, shapes, and/or radii, it is merely illustrative that the combination of A and E provide a particular combination having functional utility. Further, optional and illustrative shapes, positioning, and radii of portions A-E have been described, and it is expressly set forth that such shapes, positions, and radii, are to be construed as illustrative and enabling teachings, with reasonable deviations being expressly contemplated, and are expressly to be construed as being within the spirit and scope of the present invention. Moreover, such portions A-E, including their respective positioning, shapes, and/or radii, are provided as teachings for advantageous use with geometric dimensions of 9×19 mm Parabellum (as well as 357 SIG, 45ACP, 10 mm, and 40 caliber rounds); however, such portions, including their respective shapes, positioning, and/or radii are to be further construed as teachings to accommodate other sized rounds. In particular, any selection, shaping, positioning, and/or radii of such portions can be determined for alternatively shaped rounds based on how the illustrative embodiments and aspects herein physically manipulate 9×19 mm Parabellum rounds. Further, tolerances of the exemplary radii described herein can be up to 0.1 inches, with due consideration to adjacent and cooperating geometries related thereto. Accordingly, the present invention is expressly contemplated to apply to various types of rounds for use with single and double feed magazines types.

Therefore, it will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention. For example, while the present invention is illustratively shown used with a curved magazine, loader 100 can be configured for use with any shaped magazine, including straight, curved, etc. Further, rounds recess 120 is generally shown to be linear along the main body length 113, however, can be provided with any functionally compatible shape or shapes to the extent desired.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A method of using an ammunition magazine loader to load a plurality of ammunition rounds into an ammunition magazine having a follower, a spring providing a spring force biasing the follower upwardly, and a magazine shape, with each round respectively including first and second rounds ends and a pivot point, and with the magazine loader comprising a main body having a first main body end, a second main body end, and a main body length, a rounds recess, extending along the main body length, and having first and second rounds recess ends, a rounds recess bottom, first and second rounds recess sides, and first and second rounds recess ledges, with the rounds recess bottom, first rounds recess side, and first rounds recess ledge defining a first rounds cavity between the rounds recess bottom and the first rounds recess ledge, with the rounds recess bottom, second rounds recess side, and second rounds recess ledge defining a second rounds cavity between the rounds recess bottom and the second rounds recess ledge, and with the rounds recess being shaped to hold the plurality of rounds therein with each respective first rounds end positioned within the first rounds cavity and under the first rounds recess ledge and with each second rounds end positioned within the second rounds cavity and under the second rounds recess ledge, at least a portion of the rounds recess being shaped to accept each round into the rounds recess, the second rounds recess side terminating at a first downwardly angled portion, and the first rounds recess side including a second downwardly angled portion, and a magazine recess in communication with the rounds recess and positioned at the first main body end, the magazine recess being complementarily shaped to the magazine shape to retain the magazine in a fixed position within the magazine recess, said method comprising:

a. positioning the magazine within the magazine recess;

b. introducing the rounds into the rounds recess; and c. with a structure, pushing the rounds, via a last round, towards and into the magazine, such that as the plurality of rounds are moved towards the magazine, the pivot point of each round successively contacts the second downwardly angled portion to pivot the second rounds end of each successive round towards the magazine, the second rounds end of each successive round passes over the first downwardly angled portion, and when an exiting round exits the rounds recess, the exiting round abuts and forces at least one of the follower and a pre-loaded round in the magazine downwardly into the magazine against the spring force as the exiting round enters the magazine.

2. The method of claim 1, wherein the first downwardly angled portion is provided with a convex shape.

3. The method of claim 2, wherein the first downwardly angled portion includes an about 0.43 inch radius.

4. The method of claim 1, wherein the second downwardly angled portion is provided with a concave shape.

5. The method of claim 4, wherein the second downwardly angled portion includes an about 0.71 inch radius.

6. The method of claim 1, wherein the second rounds recess side includes a third downwardly angled portion positioned between the first downwardly angled portion and the second main body end.

7. The method of claim 6, wherein the third downwardly angled portion is provided with a convex shape.

8. The method of claim 7, wherein the third downwardly angled portion includes an about 0.80 inch radius.

9. The method of claim 6, wherein the third downwardly angled portion is provided with a concave shape.

10. The method of claim 9, wherein the third downwardly angled portion includes an about 1.22 inch radius.

11. The method of claim 6, wherein the second rounds recess side includes a fourth downwardly angled portion positioned between the first downwardly angled portion and the third downwardly angled portion.

12. The method of claim 11, wherein the third downwardly angled portion is provided with a convex shape and the fourth downwardly angled portion is provided with a concave shape.

13. The method of claim 12, wherein the third downwardly angled portion includes an about 0.80 inch radius and the fourth downwardly angled portion includes an about 1.22 inch radius.

14. The method of claim 11, wherein the first rounds recess side includes a fifth downwardly angled portion positioned between said magazine recess and the second downwardly angled portion.

15. The method of claim 14, wherein the third downwardly angled portion is provided with a convex shape, the fourth downwardly angled portion is provided with a concave shape, and the fifth downwardly angled portion is provided with a concave profile.

16. The method of claim 15, wherein the third downwardly angled portion includes an about 0.80 inch radius, the fourth downwardly angled portion includes an about 1.22 inch radius, and the fifth downwardly angled portion includes an about 0.38 inch radius.

17. The method of claim 6, wherein the first rounds recess side includes a fourth downwardly angled portion positioned between said magazine recess and the second downwardly angled portion.

18. The method of claim 17, wherein the third downwardly angled portion is provided with a convex shape, and the fourth downwardly angled portion is provided with a concave shape.

19. The method of claim 18, wherein the third downwardly angled portion includes an about 0.80 inch radius, and the fourth downwardly angled portion includes an about 0.38 inch radius.

20. The method of claim 17, wherein the third downwardly angled portion is provided with a concave shape, and the fourth downwardly angled portion is provided with a concave profile.

21. The method of claim 20, wherein the third downwardly angled portion includes an about 1.22 inch radius, and the fourth downwardly angled portion includes an about 0.38 inch radius.

22. The method of claim 1, wherein the first rounds recess side includes a third downwardly angled portion positioned between said magazine recess and the second downwardly angled portion.

23. The method of claim 22, wherein the third downwardly angled portion is provided with a concave shape.

24. The method of claim 23, wherein the third downwardly angled portion includes an about 0.38 inch radius.

* * * * *